United States Patent [19]
Takahashi

[11] Patent Number: 5,144,658
[45] Date of Patent: Sep. 1, 1992

[54] REPEATER OF DIGITAL AUDIO INTERFACE SIGNAL

[75] Inventor: Ryutaro Takahashi, Higashihiroshima, Japan

[73] Assignee: Sharp Kabushiki Kaisha, Osaku, Japan

[21] Appl. No.: 616,067

[22] Filed: Nov. 20, 1990

[30] Foreign Application Priority Data

Nov. 24, 1989 [JP] Japan ................................. 1-305648

[51] Int. Cl.$^5$ .............................................. H04L 9/00
[52] U.S. Cl. .......................................... 380/3; 380/4; 360/60; 360/68
[58] Field of Search ................... 380/3, 4, 23; 360/60, 360/68

[56] References Cited

U.S. PATENT DOCUMENTS

| | | | |
|---|---|---|---|
| 4,802,212 | 1/1989 | Freeman et al. | 380/3 |
| 4,876,617 | 10/1989 | Best et al. | 360/60 |
| 4,979,210 | 12/1990 | Nagata et al. | 380/3 |
| 5,073,925 | 12/1991 | Nagata et al. | 380/3 |

FOREIGN PATENT DOCUMENTS 58-137138 8/1983 Japan ...................... 380/3

OTHER PUBLICATIONS

"What Will Become of Audio in the 90's: Copyright Issues Related to DAT" Audio Accessory, 14, No. 54 (Autumn 1989, 325–328).

*Primary Examiner*—Thomas H. Tarcza
*Assistant Examiner*—David Cain

[57] ABSTRACT

A digital audio interface signal repeater capable of displaying how many generations a further copying of a digital audio interface signal is allowed includes: a receiving device for receiving a digital audio interface signal, a demodulator for demodulating predetermined information included in the received digital audio interface signal, and an information display device for displaying the demodulated information. The predetermined information included in the digital audio interface signal received by the receiving device is demodulated by the demodulator. The demodulated information is displayed by the information display device. Since the digital audio interface signal includes information regarding the allowed number of subsequent copying, necessary information such as the allowed number of copying of the digital audio interface signal being processed can be known by confirming a display on the information display device.

20 Claims, 6 Drawing Sheets

| bit | 0 | 1 2 3 4 5 | 6 7 | 8 9 10 11 12 13 14 15 |
|---|---|---|---|---|
| 0 | 0 | CONTROL | 0 0 | CATEGORY CODE |
| 16 | SOURCE No. | | CHANNEL No. | SAMPLING FREQUENCY / CLOCK PRECISION |
| 32 | | | | |
| 48 | | | | |
| 64 | | | | |
| 80 | | | | |
| 96 | | | | |
| 112 | | | | |
| 128 | | | | |
| 144 | | | | |
| 160 | | | | |
| 176 | | | | |

FIG.6 PRIOR ART

| BITS 1-5 | MEANING |
|---|---|
| "X0XXX" | DIGITAL COPY IS PROHIBITED |
| "X1XXX" | DIGITAL COPY IS ALLOWED |

FIG.6A PRIOR ART

| CATEGORY CODE | CATEGORY |
|---|---|
| "00000000" | 2ch GENERAL FORHAT |
| "10000000" | 2ch COMPACT DISC |
| "01000000" | 2ch PCM ENCODER/DECODER |
| "11000000" | 2ch DAT |
| "11000001" | 2ch DAT - P |
| "00100000" | 2ch BS TUNER |

REPEATER OF DIGITAL AUDIO INTERFACE SIGNAL

BACKGROUND OF THE INVENTION

1. Field of the Invention

The present invention relates generally to repeaters for transmitting received digital audio signals to external apparatus such as DATs (Digital Audio Tape Recorders) and, more particularly, to a repeater of a digital audio interface signals employing a serial copy management system (hereinafter referred to as "SCMS").

2. Description of the Related Art

Digital signal processing has made a remarkable progress in recent years.

For example, a CD (Compact Disc), on which a digital signal capable of reproducing music or the like by optical reading is recorded in advance, has replaced a record that had played a leading role as a recording medium. It appears that this substitution results from the excellent quality of a sound reproduced by digital signal processing, the superior operability of digital apparatus and so on.

A DAT has also been developed that can record a signal onto a tape as well as reproduce a signal, from the tape by employing a digital signal similar to the CD. Use of the DAT makes it possible to make any number of copies of the CD, music tapes and so on (hereinafter abbreviated as "music software"), which are now commercially put on the market, without any degradation in quality of recording.

Because of its excellent performance, the DAT has been expected to create a new demand in the music industry. However, the DAT is hardly popular at the present time. A main reason for this lack of popularity is that strong opposition arose from the music software industry i.e., the industry which supplying CDs and music tapes in the market, or music performers.

Since the DAT employs a digital signal, it enables copying of music software without any degradation in quality of recording. Further, the DAT has enhanced recording/reproduction functions using signal interleave or the like.

As a result, if there is at least one sound source supplied through a proper route, a plurality of copies can be made serially with the sound source used as a starting point. If an original sound source is recorded by employing a digital signal, its copy is made by recording a signal with identical quality as that of a proper sound source. When the sound source has information recorded by employing an analog signal, its initial copy is slightly lower in quality of recording than the sound source, whereas the subsequent copies are made by employing a digital signal, resulting in no degradation in quality of recording.

Such copying, even if it is private, infringes a copyright of an author or the like of the original sound source (17 U.S.C., Sec. 160 (1), 501 (a)).

When the DAT becomes popular, the above-described improper copies are liable to be distributed. These improper copies have the same quality as that of the original. Consequently, the DAT is liable to promote infringement of copyrights, neighboring rights, etc. of composers, song writers, performers or record manufactures.

The foregoing is a principal opinion of people who are against the distribution of the DAT. It cannot be denied that the aforementioned anxiety has sufficient roots.

Meanwhile, the excellent sound quality and superior operability of the DAT is a great attraction to those who demand the DAT. Manufactures and suppliers of hardware such as DAT decks also expect that the DAT will create a large market. Thus, the industry for supplying hardware and the industry for supplying music software have made an agreement on a system for determining the handling of music software in the DAT in their a recent conference. This system is called a serial copy management system (SCMS).

The SCMS adopts such a method that a copy made from DAT or the like employing a digital signal from a digital sound source (hereinafter referred to as "digital copy") is limited to one generation in principle. Principal contents of this method are given below:

(1) A field for designating whether a copy is allowed or not (hereinafter referred to as copy bit) is provided on a predetermined format of a digital signal to be input to DAT (Such digital signal hereinafter referred to as "digital audio interface signal".) A DAT deck determines whether a digital copy is allowed or not, with reference to the contents of the copy bit when recording a digital signal on a tape. The DAT deck newly writes a signal indicating whether a digital copy is allowed or not into a reproduced signal, if necessary, upon signal reproduction.

(2) A digital copy from a digital source including a CD is prohibited in principle. For users who want to avoid reproduction from an original source as much as possible, a digital copy is allowed with only one generation with respect to a specific source included in a table called a "white list". This principle is adopted to all sources except for a digital source that manifestly includes a copy allowing signal.

(3) It is allowed that an analog signal obtained by reproduction of a record or a CD is digital-copied onto a tape by a DAT deck via an A/D (analog/digital) converter. In this case also, however, only one generation of copying is allowed from the copied tape.

(4) No limitation is placed on the copying by an analog signal alone.

In order to realize the foregoing contents, the SCMS method utilizes information for controlling signal processing, which is called channel status information, in the digital audio interface signal. The channel status information includes a "category code" indicating the type of a sound source information such as of a copy bit indicating whether copying is allowed or not. A determination is made as to whether digital copying of a digital audio interface signal is allowed or not in accordance with both information of the category code and copy bit.

When a copy from a sound source is made, the DAT deck takes out the aforementioned channel status information in an input signal and then determines whether or not copying is allowed based on the category code and copy bit. In reproduction from a tape, the DAT deck, if necessary, changes, e.g., the category code in a reproduced signal to one that is not shown on the white list, thereby to prevent a subsequent copying.

Figure 1A:
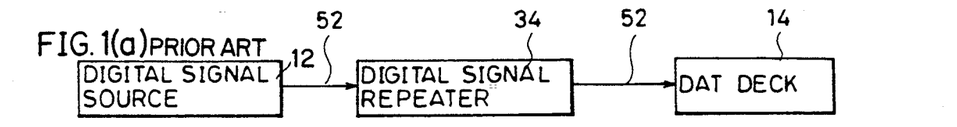
FIG. 1 is a schematic block diagram showing a copying process of a conventional digital audio interface signal.
Figure 1B:
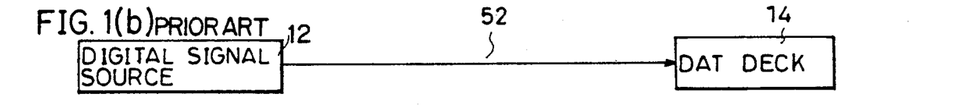
Figure 2A:
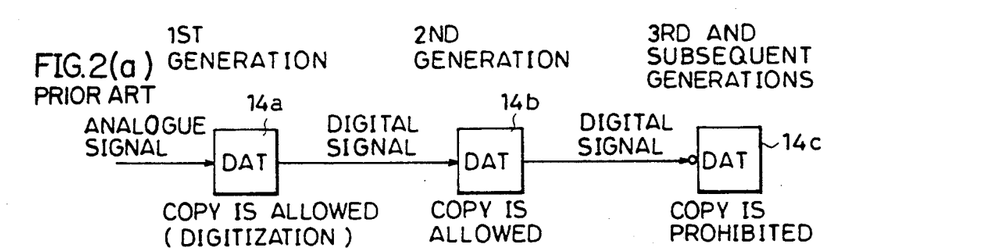
FIG. 2 is a schematic diagram showing generation management of copying by the SCMS method.
Figure 2B:
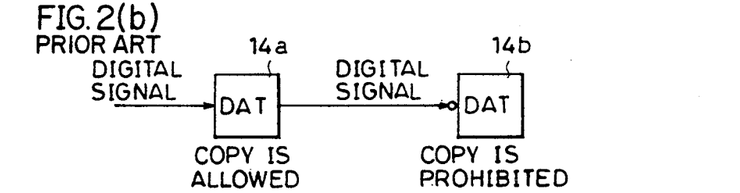
Figure 2C:
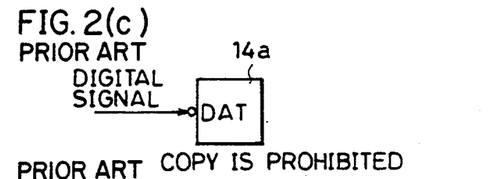
Figure 2D:
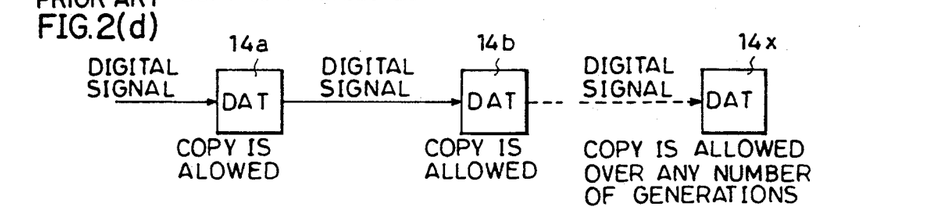

With reference to FIG. 1, a digital audio interface signal 52 output from a digital signal source 12 is conventionally input via a digital signal repeater 34 or directly to a DAT deck 14. DAT deck 14 detects per se whether or not copying of the digital signal to be input is allowed based on the channel status information.

DAT deck 14 is programmed to perform an appropriate operation in accordance with the channel status information when the copying by the digital signal is instructed by an operator. More specifically, DAT deck 14 puts itself into a recording state when the copying of the digital signal to be input is allowed, whereas it does not when the copying of the input signal is prohibited.

The digital copying employing by the SCMS method has a plurality of allowing patterns, several examples of which are shown in FIG. 2. These patterns are grasped by the concept of "generation management".

With reference to FIG. 2 (a), a DAT deck 14a can copy onto a tape an analog signal reproduced from an LP record or an analog signal obtained by reproduction of a digital sound source such as a CD. This process corresponds to the above-described case (3). Thus, one more digital copying can be made from the copied tape.

In further detail, DAT deck 14a writes a control signal into a record signal with reference to channel status information upon digitizing an analog signal and then copying the digitized signal. A category code of the control signal in this case indicates "the first digital copying from an analog sound source".

Such a case will now be considered that this tape is further digital-copied by a DAT deck 14b. This digital copying is allowed since it corresponds to the above case (3). According to the foregoing determination, information indicating "a digital copying of the second generation from the analog sound source" is recorded on a control signal in a newly copied tape.

Another case is now considered that this newly copied tape is to be further digital-copied by a DAT deck 14c. It is necessary to reproduce the tape once more in order to make a copy. In this reproduction, a control signal is also reproduced. Since this tape is the second-generation copy as described above, a deck for reproducing this control signal rewrites the contents of channel status information of an output signal, so as not to allow further copies to be made. Thus, even if DAT deck 14c is instructed to make a digital copy of a reproduced signal, the deck is not allowed to make the digital copy.

As shown in FIG. 2 (b), a digital signal to be output from a CD player or the like can be digital-copied only once by DAT deck 14a according to the principle (1). Upon this copying, information indicating "the first digital copying from a digital sound source" is recorded in a control signal according again to the principle (1). It is impossible to make another copy tape from this copied tape by DAT 14b according to the principle (1).

A case when no digital copying can be performed may occur with reference to FIG. 2 (c). One example of this case is that one borrows a tape which is digital-copied from a digital signal source by another person and attempts to make a further digital copy of this copied tape. Alternatively, such a case is also considered that one makes a digital copy of a digital sound source which is unlisted on the white list.

With reference to FIG. 2 (d), a digital audio interface signal, in which a copy bit thereof indicates "copying is allowed", can undergo any subsequent generations of digital copying.

Figure 3:
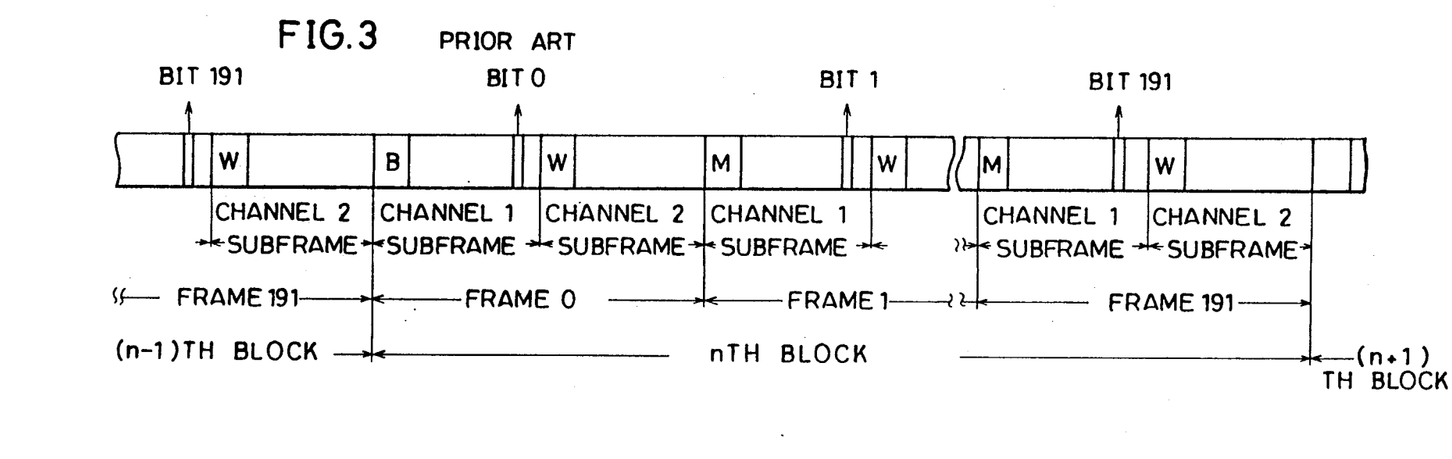
FIG. 3 is a schematic diagram showing a format of one block of a digital audio interface signal.

The digital audio interface signal employed in the SCMS method has the following format. Referring to FIG. 3, the digital audio interface signal is divided into a plurality of blocks. Each block includes 192 frames.

Figure 4:
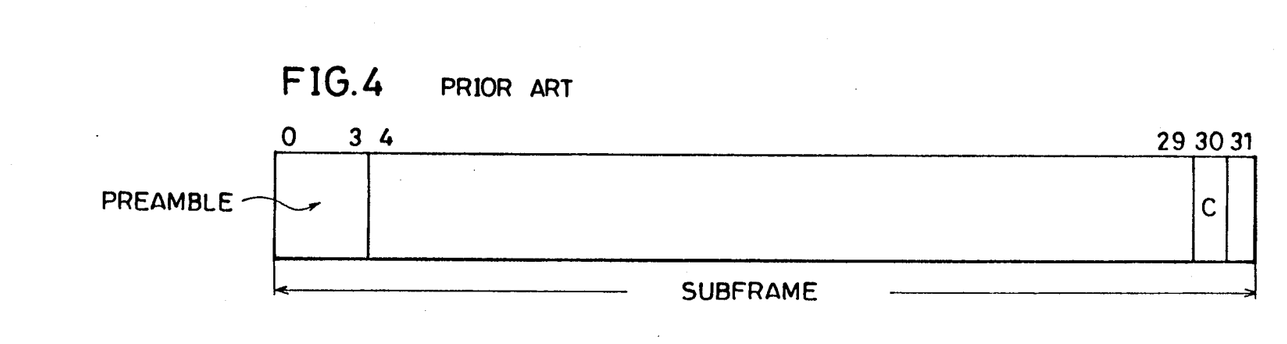
FIG. 4 is a schematic diagram showing a format of one subframe.

Each frame includes two subframes each including 32-bit data. With reference to FIG. 4, an indicator called a preamble for indicating what type of information is recorded on a subframe is located at the head of each subframe.

In a 2-channel audio signal, for example, one of the subframes belongs to a channel one, while the other subframe belongs to a channel two. The respective subframes of channels one and two are distinguished from each other by their respective preambles. That is, the preamble of the subframe of channel one is a signal denoted with the symbol "M", and that of channel two is a signal denoted with "W".

The preamble of the first subframe of the leading frame in one block is a specific preamble (denoted with "B"). Synchronization of the blocks is carried out by detection of the specific preambles "B".

With reference to FIG. 4, the 31st bit (bit 30) of each subframe of channel one is used for recording of the above-described channel status information. One block includes 192 subframes of channel one. Use of bit 30 of each subframe one enables recording of 192-bit channel status information per block. The channel status information is recorded in order from the head of the block.

In FIG. 4, only the preamble and the bit for channel status information are shown in the format of the subframe. A description as to other data is omitted so as to further facilitate the description.

Figure 5:
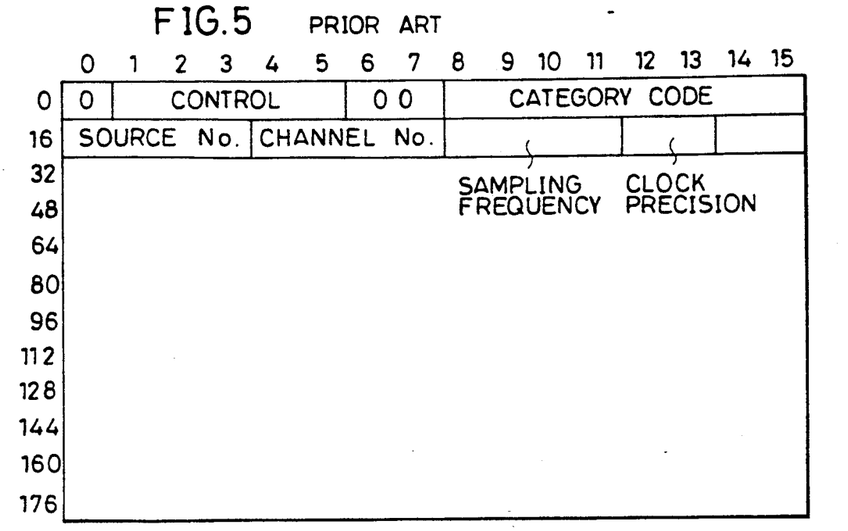
FIG. 5 is a schematic diagram showing a format of channel status information.

FIG. 5 shows a format of channel status information. The DAT deck detects channel status information from a digital audio interface signal to be input and carries out various processing according to the channel status information.

Referring to FIG. 5, bits 1-5 of the channel status information are called "control bits". The control bits represent an attribute of the digital audio interface signal.

Figure 6:
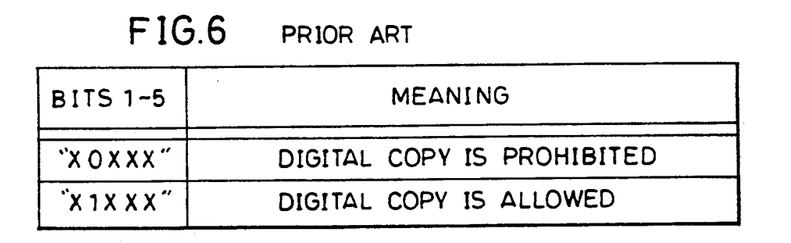
FIG. 6 is a diagram showing the meaning of control bits.

Referring to FIG. 6, combinations of each bit of the control bits indicate various meanings. Bit 2 of the control bits is a copy bit representing information that copying is allowed.

When the copy bit (bit 2 in FIG. 6) is "0", digital copying is inhibited. When the copy bit is "1", the digital audio interface signal can be digital-copied any number of times.

Figure 6A:
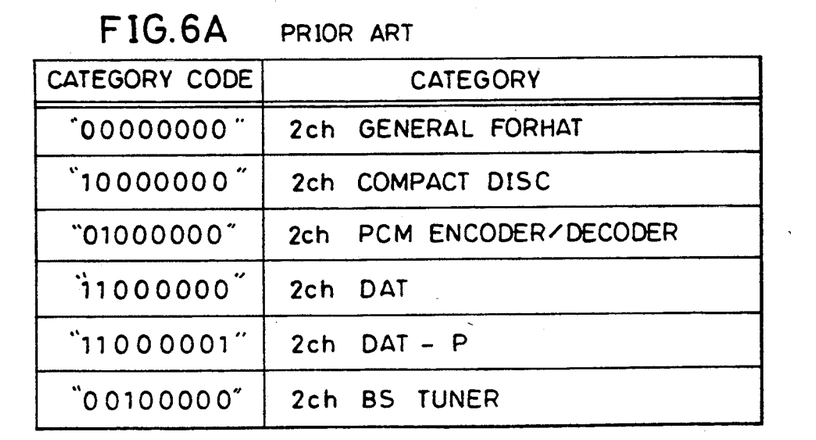
FIG. 6A is a diagram showing the relation between a category code and category.

When the copy bit is "0" as mentioned above, digital copying is inhibited in principle. However, there is a case where digital copying is allowed only once in accordance with a category code represented by bits 8-15 of FIG. 5. The detail of the category code is shown in FIG. 6A.

The category codes, which allow only a single digital copying, are listed on the white list as named before. With reference to FIG. 6A, for example, when the category code is "10000000" (CD), "11000001" (DAT-P) and so on, digital copying is allowed only once.

When making a digital copying from a sound source of the category code included in the white list, the DAT deck alters the category code of a signal to be copied into "11000000" (DAT). Since the DAT is unlisted on the white list, subsequent copying is inhibited.

As aforementioned, checking the copy bit and the category code in the channel status information makes it possible to know whether or not copying of the digital audio interface signal being under processing is allowed.

The SCMS method aims to place a limitation on a digital copy from a digital source such as music software, as described above, thereby to prevent serial, unlimited, unauthorized copying of music software. It is expected that adoption of the SCMS method to the DAT deck advances the distribution of the DAT.

However, the DAT deck in accordance with the SCMS method has the following disadvantages.

With reference to FIG. 2, the digital copying is sometimes allowed but sometimes not, as has already been described above. Even when the copying is allowed, various cases may occur with respect to how many generations the subsequent copying is allowed.

In a conventional digital signal repeated or a conventional DAT deck, however, a determination cannot be made easily as to whether a digital audio interface signal being currently processed can be copied or not. For example, no determination can be made as to whether or not the copying of a digital signal under processing is allowed, unless such as attempt is made to put the DAT deck into the recording state. Thus, the conventional digital signal repeated or DAT deck is extremely inconvenient in digital copying.

Moreover, it is not easy to know information as to how many copies can further can be made from a copied tape. This results in poor operability in digital recording.

SUMMARY OF THE INVENTION

An object of the present invention is therefore to provide a repeater of a digital audio signal which is employed alone or incorporated in a DAT deck or the like and can easily confirm information relative to allowance of copying and included in a digital audio interface signal, upon digital recording of the digital audio interface signal.

A repeater of a digital audio interface signal in accordance with the present invention includes a receiving circuit for receiving a digital audio interface signal, a demodulating circuit for demodulating predetermined information included in the input digital audio interface signal, and an information display device for displaying the demodulated information.

The apparatus according to a preferred embodiment of the present invention further includes a circuit for outputting the received digital audio interface signal to an external apparatus.

According to another preferred embodiment of the present invention, the demodulation circuit includes channel status information demodulating means for demodulating channel status information included in the digital audio interface signal.

The information display device includes a circuit for outputting the information of the allowed number of copying, enabled to take a plurality of values and indicating how many times the copying of the digital audio interface signal is further allowed in accordance with combinations of a copy allowing/prohibiting signal and category information included in the digital audio interface signal, and a display circuit for displaying one of a plurality of different symbols in accordance with the value of the information of the allowed number of copying.

The digital audio interface signal is input to the demodulation circuit by the receiving circuit. The demodulation circuit demodulates the digital audio interface signal, then extracts predetermined information included therein, i.e., channel status information and supplies the extracted information to the information display device. The information display device displays then demodulated information. Accordingly, the information included in the digital audio interface signal, especially the information indicating how many generations of copying are subsequently allowed is displayed in the a form that can be understood by the operator.

The foregoing and other objects, features, aspects and advantages of the present invention will become more apparent from the following detailed description of the present invention when taken in conjunction with the accompanying drawings.

DESCRIPTION OF THE PREFERRED EMBODIMENT

Figure 7:
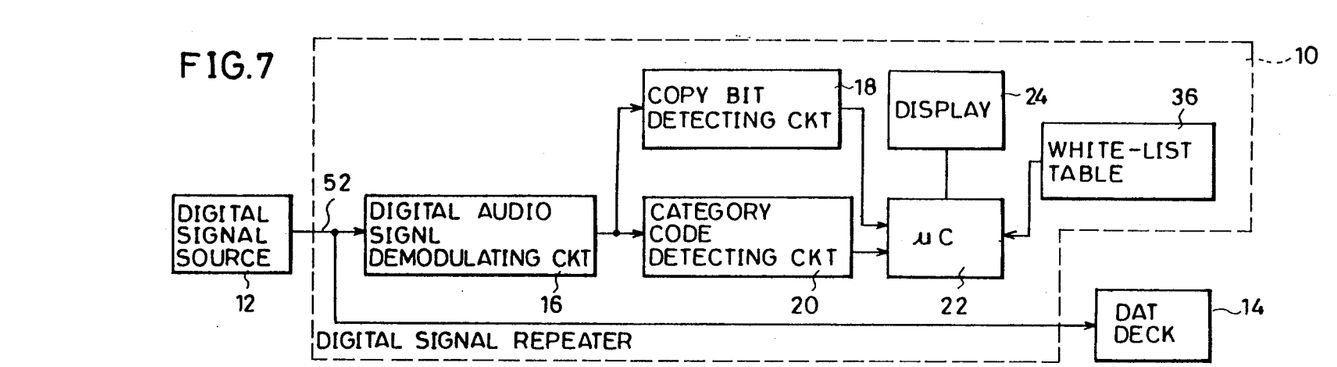
FIG. 7 is a block diagram of a digital signal repeater, which is one example of a repeater of a digital audio interface signal in accordance with the present invention.

With reference to FIG. 7, a digital signal repeater 10 according to one embodiment of the present invention serves to repeat a digital audio interface signal 52 output from a digital signal source 12 such as a CD player to a DAT deck 14.

Digital signal repeater 10 includes a digital audio interface signal demodulating circuit 16 connected to digital signal source 12, a circuit 18 for detecting a copy bit connected to an output of the circuit 16, a circuit 20 for detecting a category code, a microcomputer 22 connected to respective outputs of circuits 18 and 20, a display 24 controlled by microcomputer 22, and a white list table 36 for storing a category code included in a white list. Digital audio interface signal 52 output from digital signal source 12 is input through a processing circuit not shown to DAT deck 14.

The respective outputs of circuit 18 for detecting the copy bit and circuit 20 for detecting the category code are applied to microcomputer 22. Microcomputer 22 searches white list table 36 based on the input copy bit and category code, so as to determine how many times the copying of digital audio interface signal 52 are subsequently allowed. Microcomputer 22 displays the allowed number of copying by controlling display 24.

Figure 8A:
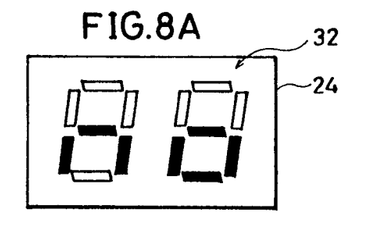
FIGS. 8A-8D show one example of a display of the allowed number of copy generations by a display employing a display tube.
Figure 8B:
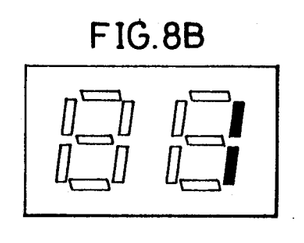
Figure 8C:
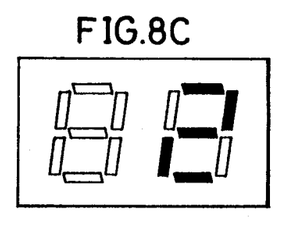

Display 24 includes a display tube 32, with reference to FIG. 8A. When no copying is allowed after the result of determination, the display tube 32 displays "no". Referring to FIG. 8B, when only a single copying is allowed thereafter, "1" is displayed. With reference to FIG. 8C, when a further copying is allowed twice, "2" is displayed by the display tube.

Figure 8D:
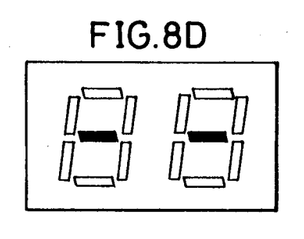

When the copy bit is "1", display tube 32 displays that any number of copying is allowed, as shown in FIG. 8D. The operator sees the information on display 24 so as to know how many times the copying is allowed.

Figure 9:
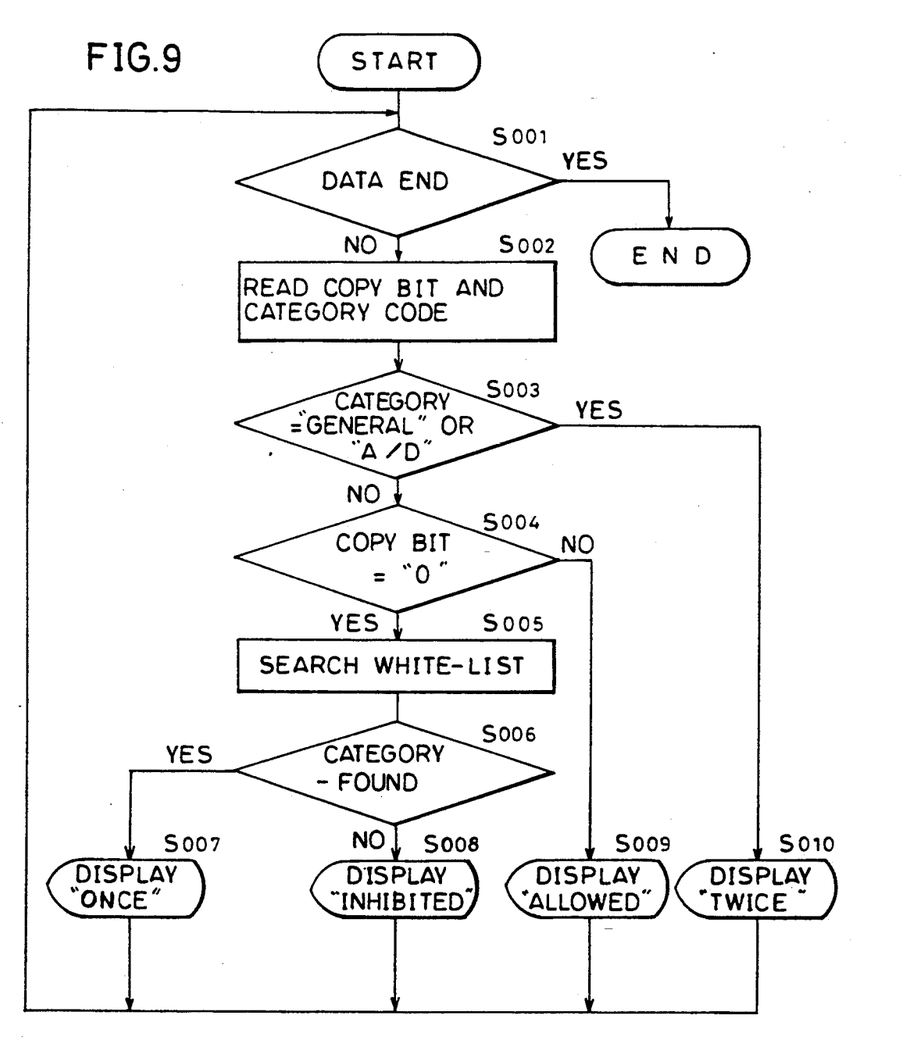
FIG. 9 is a flow chart of a program to be executed in a microcomputer of the present invention.

Referring to FIG. 9, a program to be executed by microcomputer 22 of digital signal repeater 10 of the first embodiment has the following control scheme.

In step S001, a determination is made as to whether or not data to be input, i.e., a digital audio interface signal reaches its end. When an answer to the determination is YES, the program execution is terminated. When the answer to the determination is NO, the control proceeds to step S002.

In step S002, a copy bit and a category code to be input from copy bit detecting circuit 18 and category code detecting circuit 20 (see FIG. 7) are read.

In step S003, a determination is made as to whether or not the input category code indicates a category of "general" or "via A/D converter". When the answer to the determination is YES, the control proceeds to step S010, and otherwise the control proceeds to step S004.

When the control proceeds to step S010, information indicating that "copying is allowed twice" is displayed on display 24. This is because the subsequent copying of two generations is allowed when the category is "general" or "A/D-converted" in the SCMS method.

When the control proceeds to step S004, a determination is made as to whether the copy bit input from copy bit detecting circuit 18 is "0" or not. If the answer to the determination is NO, the control proceeds to step S009, and otherwise the control proceeds to step S005.

In step S009, display 24 displays information indicating that "copying is allowed". This is because in the SCMS method, copying is prohibited in principle when the copy bit is 1; however, copying of any number of generations is allowed in the other case.

When the control proceeds to step S005, the program searches the white list stored in white list table 36 so as to discover the category code input. The control then proceeds to step S006.

A determination is made as to whether or not the corresponding category code is discovered, in step S006. When the answer to the determination is YES, the control proceeds to step S007, and otherwise the control proceeds to step S008.

In step S007, display 24 displays a message that "a single copying is allowed". This is because only a single copying of a sound source belonging to the category listed on the white list is allowed in the SCMS method.

In step S008, display 24 displays message indicating "copying is prohibited". This is because the copy bit is "1", and the category code is unlisted on the white list.

Execution of the program having the foregoing control scheme by microcomputer 22 enables monitoring of the digital audio interface signal of the SCMS method by digital signal repeater 10 shown in FIG. 7.

Figure 10:
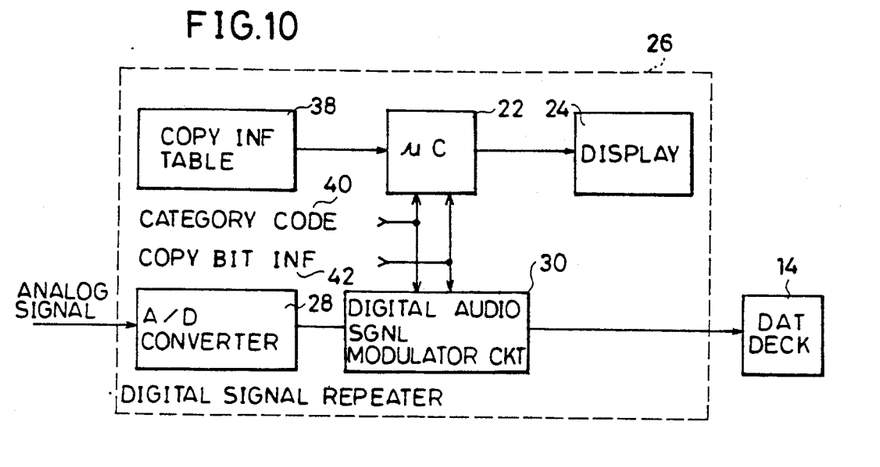
FIG. 10 is a block diagram of a digital signal repeater according to a second embodiment of the present invention.

With reference to FIG. 10, a digital signal repeater 26 according to the second embodiment of the repeater of a digital audio interface signal of the present invention serves to convert an analog signal obtained from an LP record or the like into a digital signal and transmits the converted signal to a DAT deck 14.

Digital signal repeater 26 includes an A/D converter 28 for receiving an analog signal to convert the same into a digital signal, a digital audio signal modulating circuit 30 connected to A/D converter 28 for modulating an input digital signal into a digital audio interface signal in accordance with a predetermined format and setting channel status information and other necessary information in the digital audio interface signal, a microcomputer 22 for controlling operation of digital audio signal modulating circuit 30, a display 24 controlled by microcomputer 22 for displaying information regarding how many times the copying of the digital audio interface signal to be repeated is allowed, a copy information table 38 connected to microcomputer 22 for storing information indicating how many times the copying of a sound source thereof is allowed in accordance with combinations of a category code and copy bit information included in the channel status information of the digital audio interface signal, a category code output circuit 40 for outputting a signal indicating a predetermined category code, and a copy bit output circuit 42 for outputting predetermined copy bit.

An output of category code output circuit 40 and that of copy bit information output circuit 42 are connected to microcomputer 22 and digital audio signal modulating circuit 30.

A/D converter 28 serves to convert an analog signal to be input into a digital signal.

Microcomputer 22 serves to determine how many generations the subsequent copying of the digital audio interface signal being under processing are allowed with reference to copy information table 38, in response to the outputs of category code output circuit 40 and copy bit output circuit 42.

This digital signal repeater 26 operates as follows, with reference to FIG. 10. An analog signal reproduced from an LP record, a CD and so on is input to A/D converter 28. A/D converter 28 samples the supplied analog signal on a predetermined frequency and converts the sampled signal into a digital signal, to output the same.

Digital audio signal modulating circuit 30 converts the digital signal applied from A/D converter 28 into a predetermined format as shown in FIGS. 3 and 4 and outputs the converted signal. At this time, digital audio signal modulating circuit 30 writes a category code and a copy bit applied from category code output circuit 40 and copy bit output circuit 42, respectively, into channel status information in an output signal. The signal output from circuit 30 is applied to DAT deck 14 and then copied on another tape therein.

The category code and the copy bit are supplied also to microcomputer 22. Microcomputer 22 searches copy information table 38 using the combination of the category code and the copy bit as a key and checks the allowed number of subsequent copy generations. Microcomputer 22 controls display 24 to display how many subsequent copy generations of this digital audio interface signal are allowed. The display method is identical to that shown in FIGS. 8A-8D.

Figure 11:
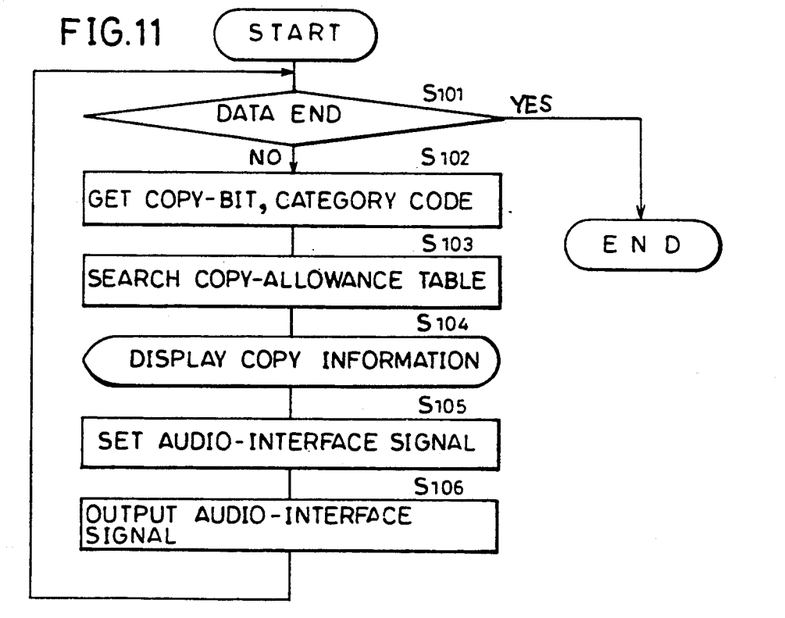
FIG. 11 is a flow chart of a program to be executed in a microcomputer of the digital signal repeater according to the second embodiment.

With reference to FIG. 11, a program to be executed in microcomputer 22 of digital signal repeater 26 according to the second embodiment has the following control scheme. In step S101, a determination is made as to whether an analog signal to be input reaches its end. When an answer to the determination is YES, the program execution is terminated. Else the control proceeds to step S102.

The copy bit and the category code supplied from category code output circuit 40 and copy bit output circuit 42 are accepted, in step S102.

Copy information table 38 is searched employing the copy bit and the category code as a key in step S103.

Searched copy information is displayed on display 24 in step S104.

In step S105, channel status information of the digital audio interface signal is set to a predetermined value. Values output from circuits 40 and 42 are set in the category code and the copy bit of this channel status information.

The digital audio interface signal is output from circuit 30 in step S106. The control then returns to step S101.

The foregoing operation of microcomputer 22 causes digital signal repeater 26 to achieve a repeating operation for digital copying of an analog signal.

It is natural that the apparatus for converting the analog signal into the digital signal to repeat the same to the DAT deck according to the second embodiment is often used in combination with the apparatus for merely repeating the digital signal as shown in the first embodiment.

As has been described heretofore, in accordance with the present invention, it is possible to check the channel status information with respect to the signal to be input from the digital signal source to the DAT deck or the signal to be digital-converted from the analog signal source and applied to the DAT deck and to display the allowed number of copy generations. This display may change with an elapse of time in accordance with a change of the signal to be input. The operator can know the allowed number of copy generations of the signal being currently processed in real time by the display and can perform an appropriate operation.

It is unnecessary for the operator to attempt to set the DAT deck in the recording state in order to confirm whether or not the digital copying of the signal being processed is allowed. The operator can immediately know the allowability of copying of the copied tape from the attribute displayed on the display. This facilitates an operation in digital copying of signals.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital audio interface signal repeater comprising:
   means for receiving a digital audio interface signal;
   means for demodulating predetermined information from the received digital audio interface signal;
   means for determining whether the digital signal may be copied and if so, a number of copies which are permitted; and
   information displaying means for displaying whether the digital signal may be copied, and if so, the number of copies which are permitted.

2. The digital audio interface signal repeater of claim 1, further comprising:
   means for outputting whether the digital audio interface signal may be copied, and if so, the number of copies which are permitted to an external apparatus.

3. The digital audio interface signal repeater of claim 1, wherein said means for demodulating demodulates channel status information included in the digital audio interface signal.

4. The digital audio interface signal repeater of claim 3, wherein said channel status information includes a category code which assumes a plurality of values for indicating a category of a sound source of the digital audio interface signal; and
   said information displaying means includes,
      category information storing means for restoring information associated with each of the plurality of values for the category code,
      category information deriving means for deriving information associated with one of the plurality of values of the category code from said category information storing means, and
      displaying means for displaying the information derived by said category code information deriving means.

5. The digital audio interface signal repeater of claim 3, wherein said channel status information includes a copy allowing/prohibiting signal, said copy allowing/prohibiting signal assuming one of a first and second value for indicating whether further copying of said digital audio interface signal is prohibited; and
   said information displaying means including,
      means for detecting a value of said copy allowing/prohibiting signal, and
      displaying means for displaying one of a first and second symbol in accordance with the first and second values of said copy allowing/prohibiting signal.

6. The digital audio interface signal repeater of claim 3, wherein said channel status information includes a copy allowing/prohibiting signal for indicating whether further copying of said digital signal is prohibited, and
   category information for indicating a category of a sound source of said digital audio interface signal; and
   said information displaying means including,
      means responsive to combinations of said copy allowing/prohibiting signal and said category information for determining a number of copies of the digital signal permitted, said number assuming one of a plurality of values in order to indicate how many times the digital signal may be copied, and
      displaying means for displaying one of a plurality of different symbols in accordance with the one of the plurality of values.

7. The digital audio interface signal repeater of claim 6, wherein said means for outputting includes,
   means for storing one of the plurality of values which indicates the allowed number of copies corresponding to each combination of said copy allowing/prohibiting signal and said category information, and
   means responsive to said copy allowing/prohibiting signal and said category information for searching said means for storing so as to derive the one of the plurality of values corresponding to the combination of said copy allowing/prohibiting signal and said category information.

8. A digital audio interface signal repeater comprising:
- an A/D converter for converting an externally applied analog signal into a digital audio interface signal;
- means responsive to an operation of said A/D converter for outputting a predetermined signal;
- modulating means for modulating the digital audio interface signal into a predetermined format in accordance with the predetermined signal;
- means for determining whether the digital audio interface signal maybe copied and if so, a number of copies which are permitted; and
- information displaying means for displaying whether the digital audio interface signal may be copied, and if so, the number of copies which are permitted in accordance with a value of said predetermined signal.

9. The digital audio interface signal repeater of claim 8, further comprising:
- means for transmitting whether the digital audio interface signal may be copied, and if so, the number of copies which are permitted to an external apparatus.

10. The digital audio interface signal repeater of claim 8, said information displaying means including,
- information storing means for storing predetermined information associated with each of a plurality of signals including said predetermined signal,
- information deriving means responsive to said predetermined signal for deriving information associated with said predetermined signal from said information storing means, and
- displaying means for displaying a symbol associated with said derived information.

11. A method for copying a digital signal comprising the steps of:
- (a) receiving the digital signal;
- (b) demodulating predetermined information from the received predetermined signal;
- (c) determining whether the digital signal may be copied, and if so, a number of copies which are permitted; and
- (d) displaying whether the digital signal may be copied, and if so, the number of copies which are permitted.

12. The method of claim 11, further comprising the step of:
- (e) outputting whether the digital signal may be copied, and if so, the number of copies which are permitted.

13. The method of claim 11, wherein said stp (b) demodulates channel status information included in the digital signal.

14. The method of claim 13, wherein the channel status information includes a category code which assumes a plurality of values for indicating a category of a sound source o the digital signal; and said step (d) includes,
- (d) (1) prestoring information associated with each of the plurality of values for the category code,
- (d) (2) deriving information associated with one of the plurality of values of the category code, and
- (d)(3) displaying the information derived in step (d) (2).

15. The method of claim 13, wherein the channel status information includes a copy allowing/prohibiting signal, the copy allowing/prohibiting signal assuming one of a first and second value for indicating whether additional copies are permitted; and
said step (d) including,
- (d) (1) detecting a value of the copy allowing/prohibiting signal, and
- (d) (2) displaying one of a first and second symbol corresponding to the first and second values assumable by the copy allowing/prohibiting signal.

16. The method of claim 13, wherein the channel status information includes a copy allowing/prohibiting signal for indicating whether additional copies are permitted, and category information for indicating a category of a sound source of the digital signal; and
said step (d) including,
- (d) (1) determining a number of copies of the digital signal which are permitted, based on the copy allowing/prohibiting signal and the category information, and
- (d) (2) displaying one of a plurality of symbols corresponding to the determined number.

17. The method of claim 16, said step (e) including,
- (e) (1) storing number of copies of the digital signal which are permitted for each combination of copy allowing/prohibiting signal and category information, and
- (e) (2) searching each combination of copy allowing/prohibiting signal and category information, and retrieving a value representing a number of copies of the digital signal which are permitted based on the copy allowing/prohibiting signal and the category information contained in the channel status information of the digital signal.

18. A method of copying a digital signal comprising the steps of:
- (a) converting an analog signal to the digital signal to be copied;
- (b) outputting a predetermined signal based on the conversion in step (a);
- (c) modulating the digital signal to be copied into a predetermined format in accordance with the predetermined signal;
- (d) determining whether the digital signal may be copied, and if so, a number of copies which are permitted; and
- (e) displaying whether the digital signal may be copied, and if so, the number of copies which are permitted.

19. The method of claim 18, further comprising the steps of:
- (f) transmitting whether the digital signal may be copied, and if so, the number of copies which are permitted, to an external apparatus.

20. The method of claim 19, said step (e) including,
- (e)(1) storing predetermined information associated with each of a plurality of signals including the predetermined signal,
- (e) (2) deriving information associated with the predetermined signal;
- (e) (3) displaying a symbol associated with the derived information.

* * * * *